(12) United States Patent  (10) Patent No.: US 7,561,423 B2
Turusaki et al.  (45) Date of Patent: Jul. 14, 2009

(54) VIDEO DISPLAY

(75) Inventors: Akira Turusaki, Kyoto (JP); Nobuyuki Take, Osaka (JP); Takeshi Okamoto, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 224 days.

(21) Appl. No.: 11/711,834

(22) Filed: Feb. 28, 2007

(65) Prior Publication Data

US 2007/0211417 A1  Sep. 13, 2007

(30) Foreign Application Priority Data

Mar. 1, 2006  (JP) .............................. 2006-054261

(51) Int. Cl.
  *G06F 1/16*  (2006.01)
(52) U.S. Cl. ....................................... 361/681; 248/917
(58) Field of Classification Search ................. 361/681, 361/679.02, 679.21
  See application file for complete search history.

(56) References Cited

U.S. PATENT DOCUMENTS

| | | | |
|---|---|---|---|
| 7,175,152 B2* | 2/2007 | Dittmer | 361/681 |
| 7,334,765 B2* | 2/2008 | Hwang | 361/681 |
| 2004/0232298 A1* | 11/2004 | Bremmon et al. | 361/681 |
| 2005/0174726 A1* | 8/2005 | Bang et al. | 361/681 |
| 2006/0113445 A1* | 6/2006 | Parsons | 361/681 |
| 2006/0274488 A1* | 12/2006 | Simmons et al. | 361/681 |
| 2007/0097617 A1* | 5/2007 | Searby et al. | 361/686 |
| 2008/0117580 A1* | 5/2008 | Dittmer et al. | 361/681 |

* cited by examiner

*Primary Examiner*—Lisa Lea-Edmonds
(74) *Attorney, Agent, or Firm*—Westerman, Hattori, Daniels & Adrian, LLP.

(57) ABSTRACT

A video display has a cabinet. The cabinet has a first through hole penetrating in a direction orthogonal to a screen of a monitor body. The back of the monitor body is covered with the cabinet. An insert nut has a second through hole with an inside diameter smaller than an inside diameter of the first through hole, and inserted into the first through hole such that a through hole direction of the second through hole is along the direction orthogonal to the screen. A wall-mounting fitting has a third through hole to be communicated with the second through hole. On the front surface of the cabinet, the wall-mounting fitting is provided. A bolt is engaged with the second through hole through the third through hole.

8 Claims, 7 Drawing Sheets

(A)

(B)

VIDEO DISPLAY

CROSS REFERENCE OF RELATED APPLICATION

The disclosure of Japanese Patent Application No. 2006-54261 is incorporated herein by reference.

BACKGROUND OF THE INVENTION

1. Field of the Invention

The present invention relates to a video display. More specifically, the present invention relates to a wall-mounting video display.

2. Description of the Related Art

One example of an apparatus of such a kind is disclosed in Patent Document. According to the related art, a wall surface fitting is screwed on a wall surface, and a tilt fitting is screwed into the wall surface fitting. Each of bodies of bolts screwed on both sides of a video monitor is inserted from an open end of a hole provided on the tilt fitting so as to be screwed with the bolt. However, in the related art, the bolt is screwed into the side of the video monitor, and this requires a corresponding dimension in a thickness direction. In addition, the tilt fitting is exposed on the side of the video monitor, resulting in restrain on a degree of flexibility in design.

SUMMARY OF THE INVENTION

According to the preferred embodiments, a video display, comprises: a monitor body having a screen for displaying a video; a cabinet having a first through hole penetrating in a predetermined direction crossing the screen, and covering a back of the monitor body; a nut having a second through hole with an inside diameter smaller than an inside diameter of the first through hole, and being inserted into the first through hole such that a through hole direction of the second through hole is along the predetermined direction; a wall-mounting member having a third through hole to be communicated with the second through hole, and provided on a surface of the cabinet; and a bolt engaged with the second through hole through the third through hole.

The above described features, aspects and advantages of the embodiments will become more apparent from the following detailed description of the embodiment when taken in conjunction with the accompanying drawings.

DETAILED DESCRIPTION OF THE PREFERRED EMBODIMENTS

Figure 1:
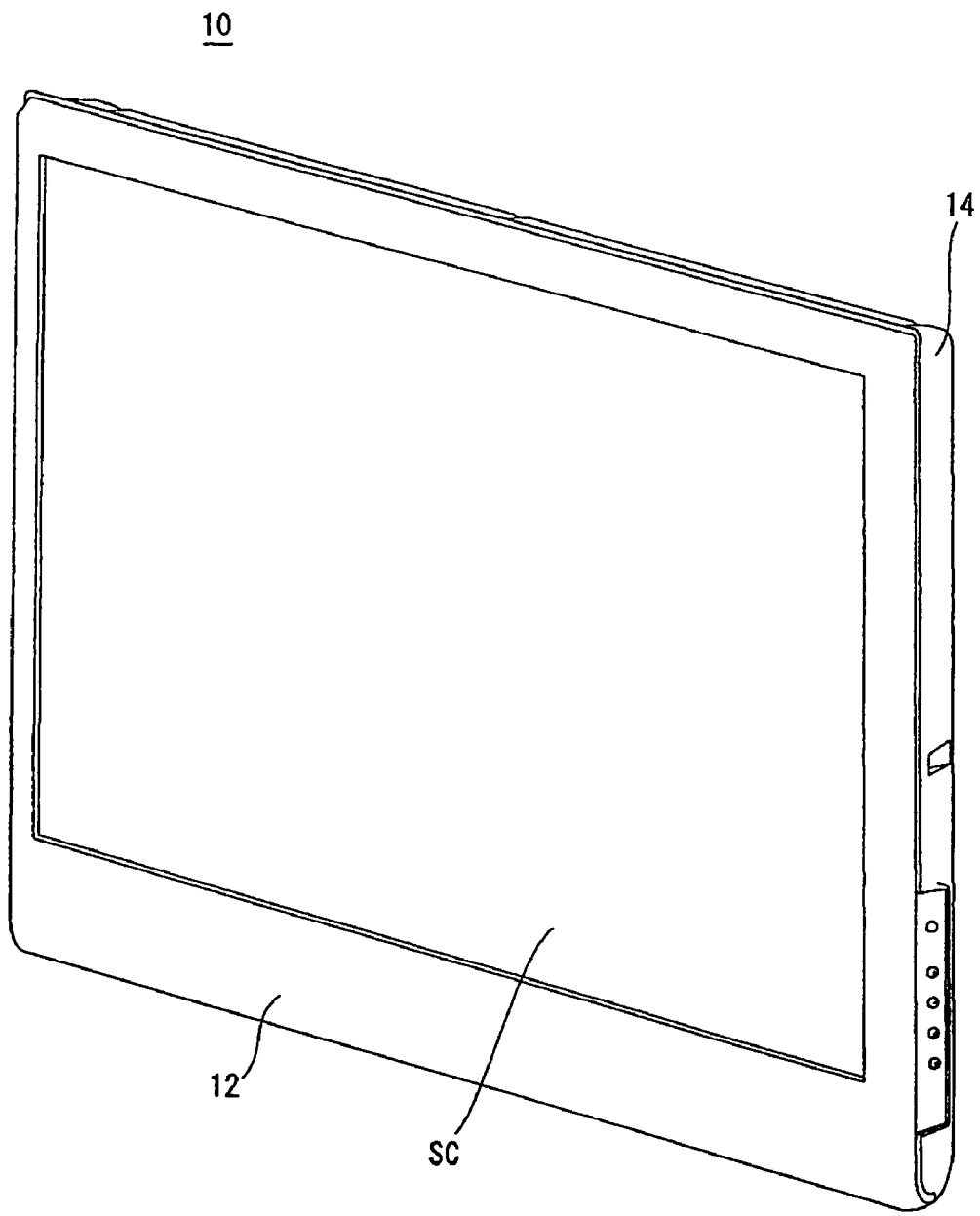
FIG. 1 is a perspective view showing a video display of this embodiment from a front side.

Referring to FIG. 1, a video display 10 in accordance with the present embodiment is a wall-mounting display conforming to the VESA standard, and has a monitor body 12. On the front surface of the monitor body 12, a screen SC for displaying a video is furnished. The back of the monitor body 12 is covered with a polystyrene back cabinet 14.

Figure 2:
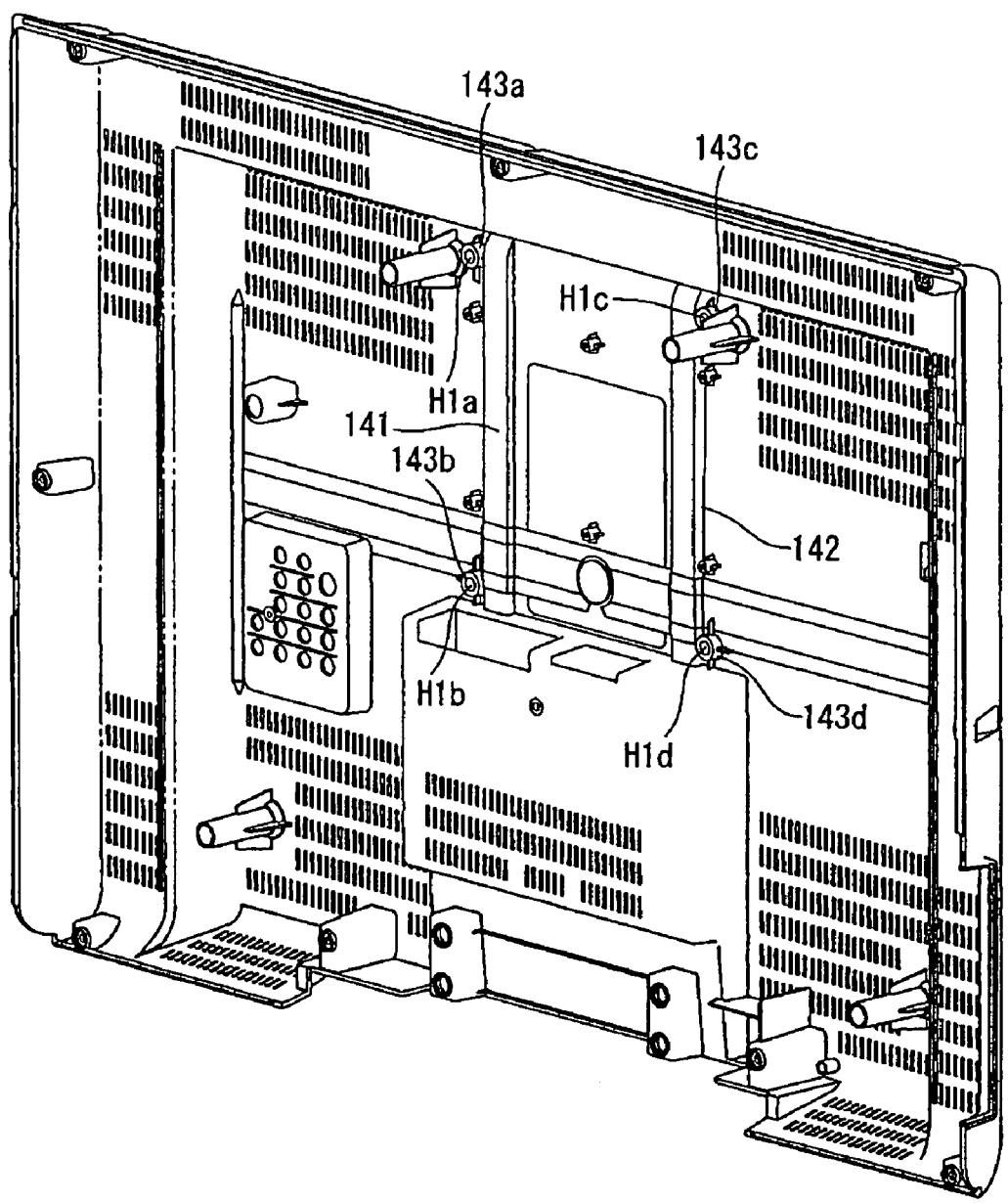
FIG. 2 is a perspective view showing a back cabinet of this embodiment from a rear surface side.
Figure 3:
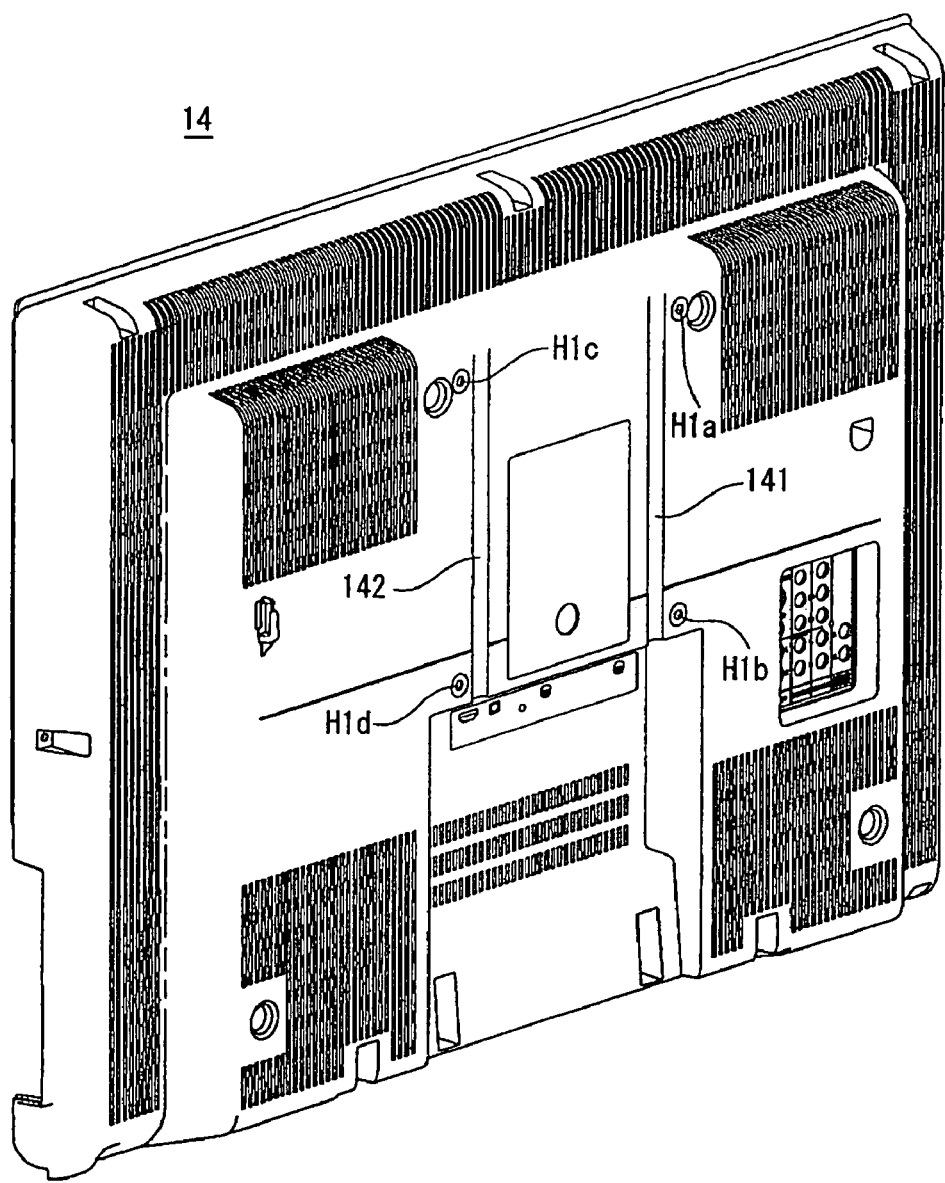
FIG. 3 is a perspective view showing the back cabinet of this embodiment from a front surface side.

Referring to FIG. 2 and FIG. 3, at the center and slightly above a main surface of the back cabinet 14, two embossing portions 141 and 142 extending linearly in the vertical direction are integrally formed. Both of the embossing portions 141 and 142 are formed such that the convex portions appear on a rear surface of the back cabinet 14. By arranging the embossing portions 141 and 142 in the horizontal direction, it is possible to improve a bending strength in the vertical direction of the back cabinet 14. Furthermore, the convex portions appear on the rear surface, so that wall-mounting is not hindered by the embossing portions 141 and 142.

In the vicinity of the embossing portion 141, protrude cylindrical portions 143$a$ and 143$b$ are integrally formed on the rear surface of the back cabinet 14. Similarly, in the vicinity of the embossing portion 142, protrude cylindrical portions 143$c$ and 143$d$ are integrally formed on the rear surface of the back cabinet 14. The cylindrical portions 143$a$ and 143$b$ are provided outside the embossing portion 141 along the longitudinal direction of the embossing portion 141. Similarly, the cylindrical portions 143$c$ and 143$d$ are provided outside the embossing portion 142 along the longitudinal direction of the embossing portion 142.

The cylindrical portions 143$a$-143$d$ respectively have through holes H1$a$-H1$d$ penetrating in a direction orthogonal to the screen SC. The lengths of the cylindrical portions 143$a$-143$d$ are equal to one another, and the lengths of the through holes H1$a$-H1$d$ are equal to one another. The inside diameters of the through holes H1$a$-H1$d$ are equal to one another.

Figure 4:
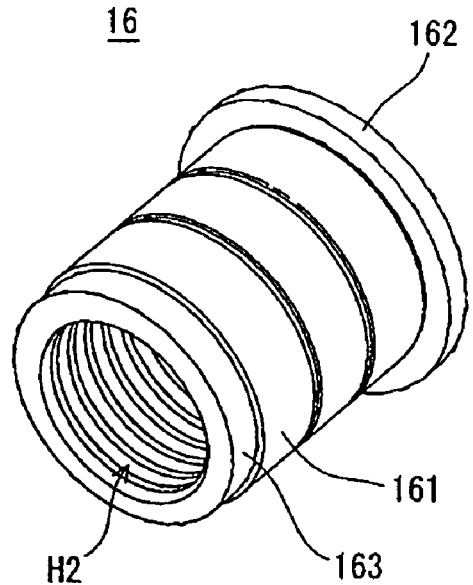
FIG. 4(A) is a perspective view showing an insert nut of this embodiment from a certain point of view.
FIG. 4(B) is a perspective view showing the insert nut of this embodiment from another point of view.
Figure 4:
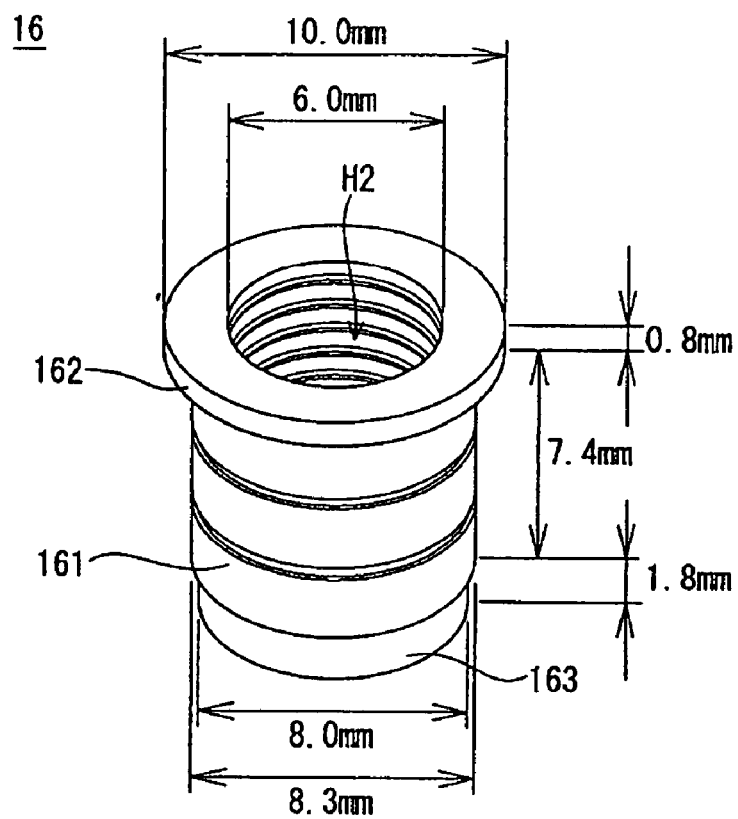

Into each of the through holes H1$a$-H1$d$, an insert nut 16 shown in FIG. 4(A) or FIG. 4(B) is inserted. The insert nut 16 is made of brass (iron or stainless steel may be possible), and has a nut body 161 with a through hole H2. At one end of the longitudinal direction of the nut body 161, a flange 162 with an enlarged diameter is formed, and at the other end of the longitudinal direction of the nut body 161, a reduced diameter portion 163 with a reduced diameter is formed. On an outer wall of the nut body 161, circumferential grooves are formed, and on an inner wall of the nut body 161, a spiral groove is formed. On inner walls of the flange 162 and the reduced diameter portion 163, spiral grooves are also formed, and the grooves are continuous to the groove of the inner wall of the nut body 161.

The outside diameter of the nut body 161 is slightly larger than the inside diameter of each of the through holes H1$a$-H1$d$. The outside diameter of the flange 162 is larger than the inside diameter of each of the through holes H1$a$-H1$d$. The outside diameter of the reduced diameter portion 163 is slightly smaller than the inside diameter of each of the through holes H1$a$-H1$d$. The inside diameter of the nut body 161 is smaller than the inside diameter of each of the through holes H1$a$-H1$d$ by the dimension corresponding to the thickness of the nut body 161. The length of the nut body 161 is approximately equal to each of the lengths of the through holes H1a-H1d.

More specifically, the outside diameter and the inside diameter of the nut body 161 are 8.3 mm and 6.0 mm, respectively. The outside diameter of the flange 162 is 10.0 mm, and the outside diameter of the reduced diameter portion 163 is 8.0 mm. Furthermore, the length of the nut body 161 is 7.4 mm, and the length (thickness) of the flange 162 is 0.8 mm, and the length of the reduced diameter portion 163 is 1.8 mm.

Figure 5:
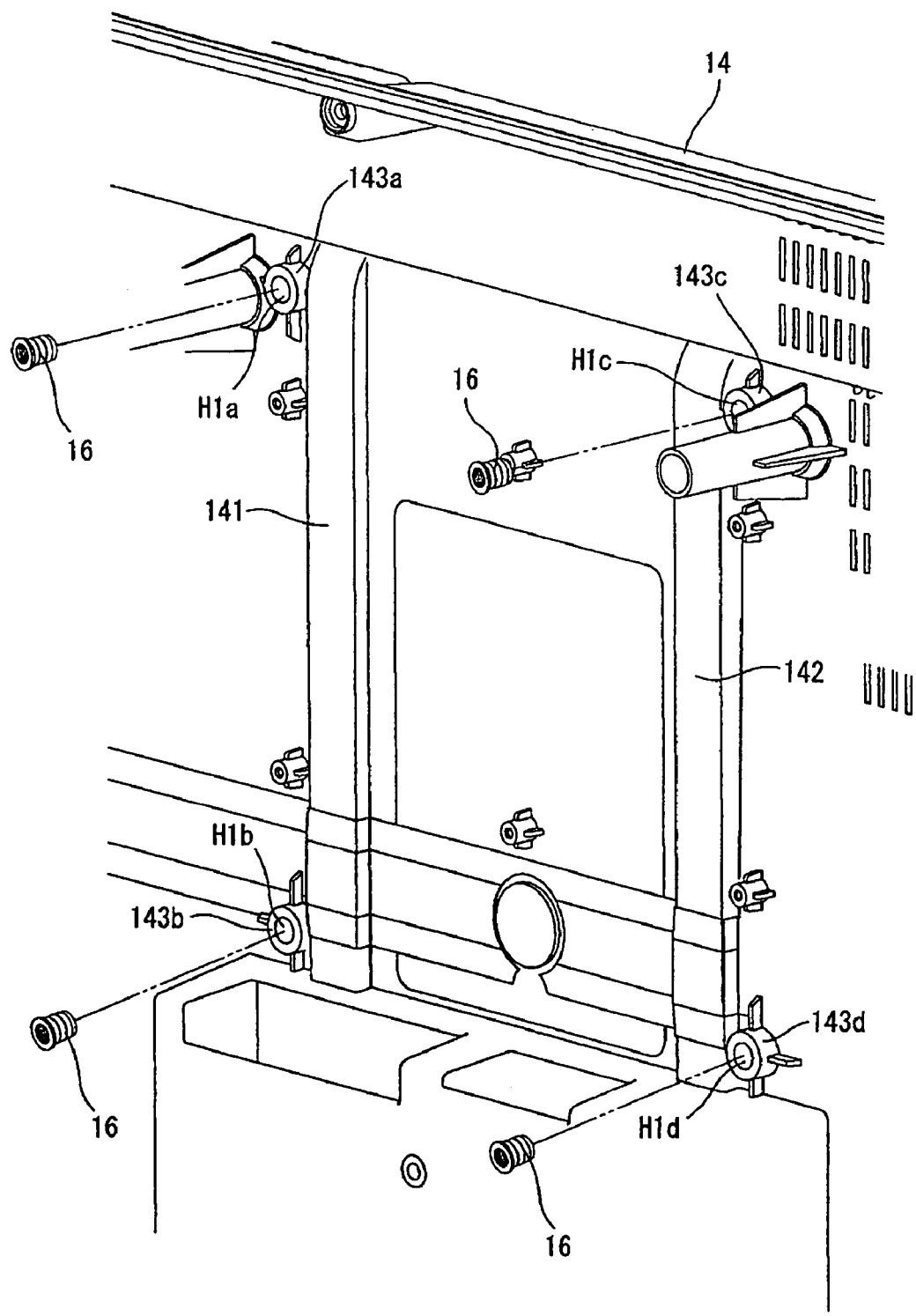
FIG. 5 is an illustrative view showing a state in which the insert nut of this embodiment is attached to the back cabinet.

The insert nut 16 is inserted into each of the through holes H1a-H1d from the rear surface of the back cabinet 14 as shown in FIG. 5. The inserted insert nut 16 is connected with the back cabinet 14 by thermal fusion. More specifically, circumferential grooves formed on the outer wall of the nut body 161 are connected with the inner wall of each of the through holes H1a-H1d by thermal fusion.

In the attached state, the flange 162 is exposed from each of the through holes H1a-H1d to the outside. Furthermore, the through hole direction of the through hole H2 is coincident with the through hole direction of each of the through holes H1a-H1d. In addition, the central axis of the through hole H2 is coincident with the central axis of each of the through holes H1a-H1d.

Figure 6:
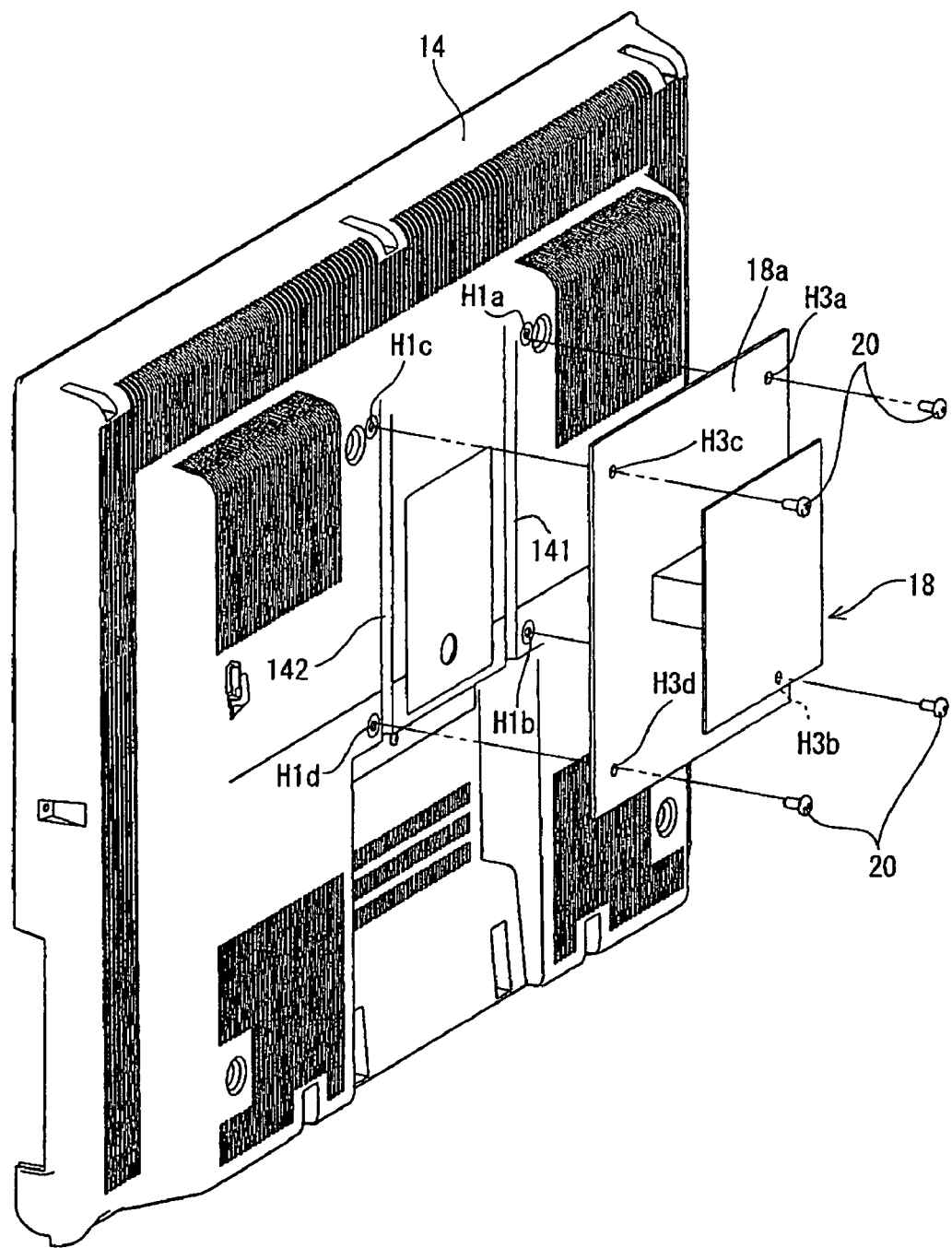
FIG. 6 is an illustrative view showing a state in which a wall-mounting fitting of this embodiment is mounted on the back cabinet.

Referring to FIG. 6, a wall-mounting fitting 18 is furnished with a platelike fitting 18a. A fitting 18a is in the form of a rectangle, and at the four corners, through holes H3a-H3d are provided. The through hole direction of each of the through holes H3a-H3d is coincident with the thickness direction of the fitting 18a The distance from the through hole H3a to the through hole H3b is coincident with the distance from the through hole H1a to the through hole H1b, and the distance from the through hole H3c to the through hole H3d is coincident with the distance from the through hole H1c to the through hole H1d. In addition, the distance from the through hole H3a to the through hole H3c is coincident with the distance from the through hole H1a to the through hole H1c, and the distance from the through hole H3b to the through hole H3d is coincident with the distance from the through hole H1b to the through hole H1d. Additionally, the inside diameter of each of the through holes H3a-H4d is approximately coincident with the inside diameter of the through hole H2.

Figure 7:
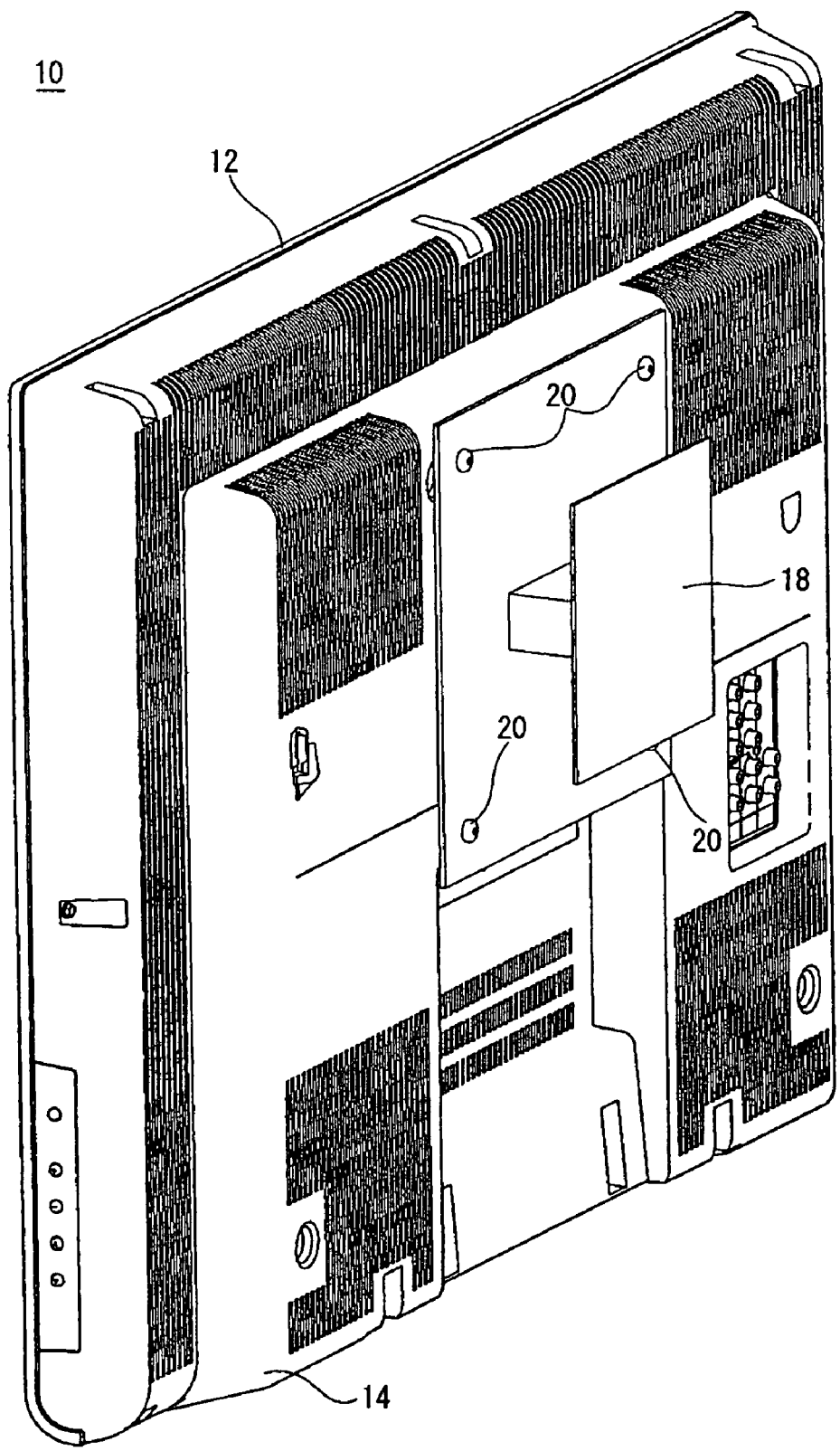
FIG. 7 is a perspective view showing the video display mounted with the wall-mounting fitting of this embodiment from a back.

The mounting fitting 18 is mounted on the back cabinet 14 in the following manner. First, the mounting fitting 18 is arranged on the front surface of the back cabinet 14 such that the through holes H3a-H3d are communicated with the through holes H1a-H1d, respectively. A bolt 20 has a spiral thread to be engaged with the spiral groove of the through hole H2 of the insert nut 16. The bolt 20 is inserted into each of the through holes H3a-H3d from the front surface of the fitting 18a, and then screwed in the through hole H2 of the insert nut 16 thermally fused to the back cabinet 14. That is, the bolt 20 is engaged with the insert nut 16 through the fitting 18a. The back cabinet 14 attached with the mounting fitting 18 is mounted on the monitor body 12 in the manner shown in FIG. 7.

As understood from the above description, the monitor body 12 has the screen SC for displaying a video. The cabinet 14 has the through hole H1 penetrating in a direction orthogonal to the screen SC. The back of the monitor body 12 is covered with the cabinet 14. The insert nut 16 has the through hole H2 with an inside diameter smaller than that of the through hole H1, and is inserted into the through hole H1 such that the through hole direction of the through hole H2 is along the direction orthogonal to the screen SC. The wall-mounting fitting 18 has the through hole H3 to be communicated with the through hole H2. On the front surface of the cabinet 14, the wall-mounting fitting 18 is provided. The bolt 20 is engaged with the through hole H2 via the through hole H3.

By utilizing the through hole H1 provided on the rear surface of the cabinet 14 for the purpose of wall-mounting, it is possible to make the monitor body 12 thinner and improve a degree of flexibility in design. Furthermore, the bolt 20 is engaged with the through hole H2 of the insert nut 16 inserted into the through hole H1 of the cabinet 14, and the monitor body 12 and the cabinet 14 are supported by the bolt 20 and the insert nut 16. This makes it possible to improve a tolerance with respect to downward forces.

It should be noted that in this embodiment, the through hole direction of each of the through holes H1a-H1d is the direction orthogonal to the screen SC, but is not limited to the orthogonal direction to the screen SC as long as it is the direction crossing the screen SC. Furthermore, in this embodiment, each of the embossing portions 141 and 142 extends in the vertical direction, but it is not limited thereto if it has a vertical component (it is not the horizontal direction). Thus, an embossing portion may be formed like drawing X, for example.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video display, comprising:
   a monitor body having a screen for displaying a video;
   a cabinet having a first through hole penetrating in a predetermined direction crossing said screen, and covering a back of said monitor body;
   a nut having a second through hole with an inside diameter smaller than an inside diameter of said first through hole, and being inserted into said first through hole such that a through hole direction of said second through hole is along said predetermined direction;
   a wall-mounting member having a third through hole to be communicated with said second through hole, and provided on a surface of said cabinet; and
   a bolt engaged with said second through hole through said third through hole.

2. A video display according to claim 1, wherein said nut is inserted from a rear surface of said cabinet to said first through hole.

3. A video display according to claim 2, wherein said nut has a flange formed at an end on the side of said rear surface.

4. A video display according to claim 1, wherein said nut inserted into said first through hole is thermally fused to said cabinet.

5. A video display according to claim 1, wherein said cabinet is made of synthetic resin, and each of said nut and said bolt is made of metal.

6. A video display according to claim 1, wherein said cabinet further includes a linear embossing portion integrally formed therewith.

7. A video display according to claim 6, wherein said embossing portion has a vertically extending component.

8. A video display according to claim 6, wherein said embossing portion is formed so as to be protruded to said inner surface side.

* * * * *